United States Patent [19]
Tabata et al.

[11] Patent Number: 6,066,351
[45] Date of Patent: *May 23, 2000

[54] METHOD FOR TREATING RAW FOODS

[75] Inventors: Yutaka Tabata; Seigi Minowa, both of Chiba, Japan

[73] Assignee: Tabata, Inc., Chiba, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/037,395

[22] Filed: Mar. 9, 1998

[51] Int. Cl.$^7$ ........................................... A23L 3/00
[52] U.S. Cl. ........................ 426/520; 426/312; 426/632
[58] Field of Search .................... 426/520, 486, 426/312, 281, 632

[56] References Cited

U.S. PATENT DOCUMENTS

| | | | |
|---|---|---|---|
| 4,276,316 | 6/1981 | Sharma | 426/520 |
| 4,748,030 | 5/1988 | Illy | 426/486 |
| 5,208,058 | 5/1993 | Kotani et al. | 99/470 |
| 5,305,688 | 4/1994 | Kotani et al. | 426/486 |

*Primary Examiner*—George C. Yeung
*Attorney, Agent, or Firm*—Graham & James LLP

[57] ABSTRACT

An anti-oxidation technique for treating raw foods, such as nuts and seeds, so as to make them oxidation-resistant. In the technique of the present invention, foodstuffs such as nuts, seeds, etc., are heated under pressure in a tightly closed vessel, so that the texture of the raw food materials is slightly softened, and so that the moisture activity value is at the same time adjusted to a value in the polymolecular-layer moisture region of approximately 0.3–0.4. As a result, the water molecules are absorbed on the surfaces of the lipid molecules so that a polymolecular layer of water is formed and strong bonds between the water and proteins act synergistically to prevent penetration of oxygen into the interior texture of the foodstuff, such as nuts, thus conspicuously hindering oxidation.

16 Claims, 6 Drawing Sheets

METHOD FOR TREATING RAW FOODS

RELATED APPLICATION

This application is related to U.S. Pat. No. 5,305,688 and U.S. Pat. No. 5,208,058, and therefore incorporates by reference each patent.

TECHNICAL FIELD OF THE APPLICATION

This invention relates generally to a method and apparatus for facilitating the treatment of raw food materials, and more specifically, to a method and apparatus for preventing or retarding the oxidation of nuts with a high fat content.

BACKGROUND OF THE INVENTION

Methods and apparatus to retard or prevent the oxidation of foods have become particularly advantageous in retaining the condition and therefore, commercial value of certain foods. More particularly, when heated, fats within foods oxidize and cause the condition of such foods to degenerate.

For instance, when nuts and seeds that generally contain large amounts of fats are heated by a treatment such as roasting, etc., the fats begin to oxidize, which causes abnormal odor and deteriorated flavor, thus lowering the commercial value of such foods. Since oxidation will continue through the generation of peroxidized lipids caused by the presence of oxygen, it is necessary to eliminate such oxygen to prevent the deterioration of foods, such as nuts and seeds.

Conventional methods to retard or prevent oxidization of foods include the sealing of an oxygen-removing agent within the food's packaging container; replacing the air within the container by an inert gas such as nitrogen or carbon dioxide gas, etc.; and producing an oxygen-free state by vacuum packing. Also typical of such conventional methods is the addition of an anti-oxidant such as tocopherol.

Conventional methods fail to provide a cost-effective workable solution to retard or to prevent oxidization of food such as nuts and seeds. For instance, sealing of an oxygen-removing agent within the food's packaging requires the combined use of gas barrier film that increases packaging costs. Moreover, considerable effort is required to control the effectiveness of the oxygen-removing agent.

Conventional methods of gas substitution packaging and vacuum packaging require costly equipment and costly set-up expense. Furthermore, with either gas substitution or vacuum packaging, once a container is opened, the entry of oxygen counteracts the oxidation-inhibiting effects of treated products maintained in an oxygen-free state or in a nearly oxygen-free state.

Conventional methods of adding anti-oxidants, although initially effective, later fail when the anti-oxidants naturally change and become ineffective. Hence, such agents are generally inappropriate for long-term preservation of foods such as nuts. Furthermore, it is difficult to uniformly penetrate and distribute an anti-oxidant within solid nuts. Additionally, for some types of nuts, the amount of anti-oxidant distributed within the nuts varies even within the same lot of nuts.

As a result, there has been a longfelt need for a reliable, cost effective method and apparatus for treating raw food material such as nuts and seeds so as to make them oxidation-resistant.

SUMMARY OF THE INVENTION

The present invention substantially improves on conventional methods and apparatus used to treat raw food material such as nuts and seeds so as to make them oxidation-resistant. The apparatus and method of the present invention provide an effective, reliable anti-oxidation treatment of raw food material, such as nuts and seeds, at low cost and without the addition of additives. It will be appreciated that the present invention may also be applied to other foodstuffs such as food containing oils such as soybeans; cereals such as rice, wheat or corn; coffee beans; cacao beans; dried fruits; dried fish or dried flesh of birds or other animals; dried milk products and condiments. The above list is purely illustrative of the broad scope of the present invention and should not be construed to limit the application of the present invention to a given list of foodstuffs.

In regard to most roasted or dried foodstuffs and particularly in the case of nuts and seeds as described in a preferred embodiment below, the moisture activity is low, e.g., in the moisture region of the mono-molecular layer. Furthermore, in regard to the texture of such products, the products are converted by roasting or drying from a state in which the products are completely filled with lipids and water when in the raw state or in the state prior to drying to a state in which a sponge-like porous texture is formed as a result of only the water being lost. Accordingly, oxygen in the air tends to react directly with the lipids, so that oxidation is easily promoted.

In the present invention, foodstuffs such as nuts, seeds, etc., are heated under pressure in a tightly closed vessel, so that the texture of the raw food materials is slightly softened, and so that the moisture activity value is at the same time adjusted to a value in the polymolecular-layer moisture region of approximately 0.3–0.4. As a result, the water molecules are absorbed on the surfaces of the lipid molecules so that a polymolecular layer of water is formed and strong bonds between the water and proteins act synergistically to prevent penetration of oxygen into the interior texture of the foodstuff, such as nuts, thus conspicuously hindering oxidation.

Generally, the monomolecular layer adsorption of moisture in low-moisture foodstuffs is partial, so that such low-moisture foodstuffs are easily affected by oxygen. However, because a polymolecular layer is formed by the present invention's heat treatment of raw food material under pressure, the deterioration rate of the food is conspicuously retarded, and in some cases, prevented.

Examples of nuts that can be used in the present invention include walnuts, pecans, peanuts, almonds, hazelnuts, cashews, pistachio nuts, brazil nuts and macadamia nuts, etc. For each nut listed above, the inner "shelled nut" is used and the hard outer shells or hulls are removed.

Examples of seeds that can be used in the present invention include pine "nuts," sesame seeds, sunflower seeds, pumpkin seeds, poppy seeds and pasania seeds, etc. These raw food materials can be used in raw form or in roasted form. However, in cases where a roasted product is used, an appropriate moisture content is required for the formation of the aforementioned polymolecular layer. Accordingly, it is desirable that the moisture content be in the approximate range of 0.9 to 2.5 percent. Depending on the intended use, various raw food material forms such as half-cut or granulated forms, etc., may be used.

The nuts and seeds listed above are provided for the purpose of describing embodiments of the present invention. Thus, one of ordinary skill in the art will understand that such examples should not be construed to limit the application of the present invention, and that the present invention may be applied to a wide variety of raw food materials.

The invention may be better appreciated from the following Figures, taken together with the accompanying Detailed Description of the Invention.

BRIEF DESCRIPTION OF THE DRAWINGS

The invention will now be described with reference to the accompanying drawings, wherein.

DETAILED DESCRIPTION OF A PREFERRED EMBODIMENT

The following description is of the best presently contemplated mode of carrying out the invention. The description is made for the purpose of illustrating the general principles of the invention and is not to be taken in a limiting sense. Although the food item "nuts" is generally used to discuss the present invention, one of ordinary skill in the art will recognize that "nuts" is used as an example and that other raw food materials, such as seeds, would similarly benefit from the oxidation treatment of the present invention.

Figure 1A:
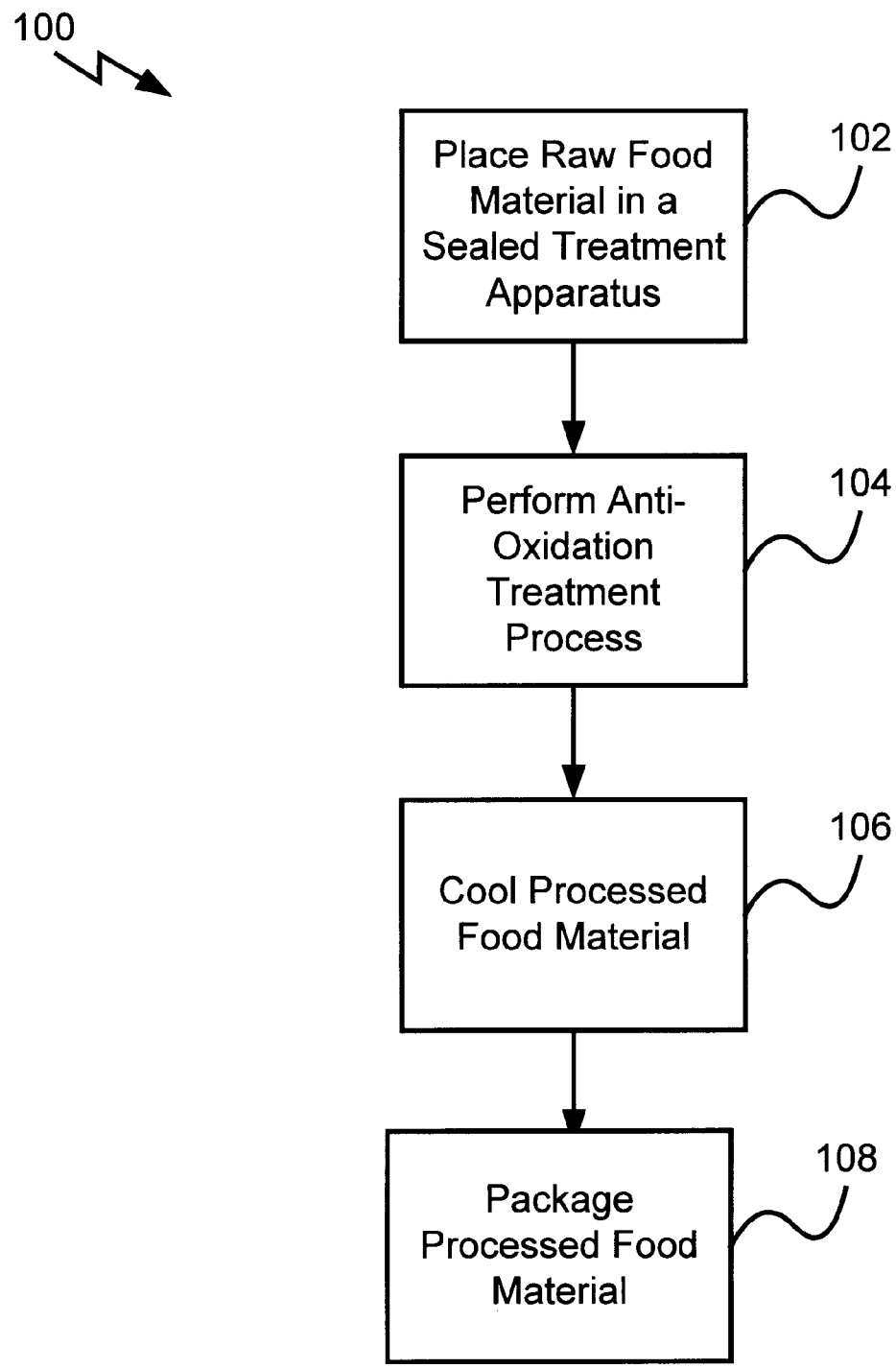
FIG. 1a shows a flowchart of the raw food material treatment process in accordance with the present invention.

Referring first to FIG. 1a, the raw food material treatment process 100 may be generally appreciated. The treatment begins in step 102 by placing the nuts in a sealed treatment apparatus equipped with a heat source. In step 104, apply the anti-oxidation treatment process to the nuts. In step 106, upon completion of the anti-oxidation treatment, cool the processed food material. In step 108, package the processed food material in food packaging materials.

Figure 1B:
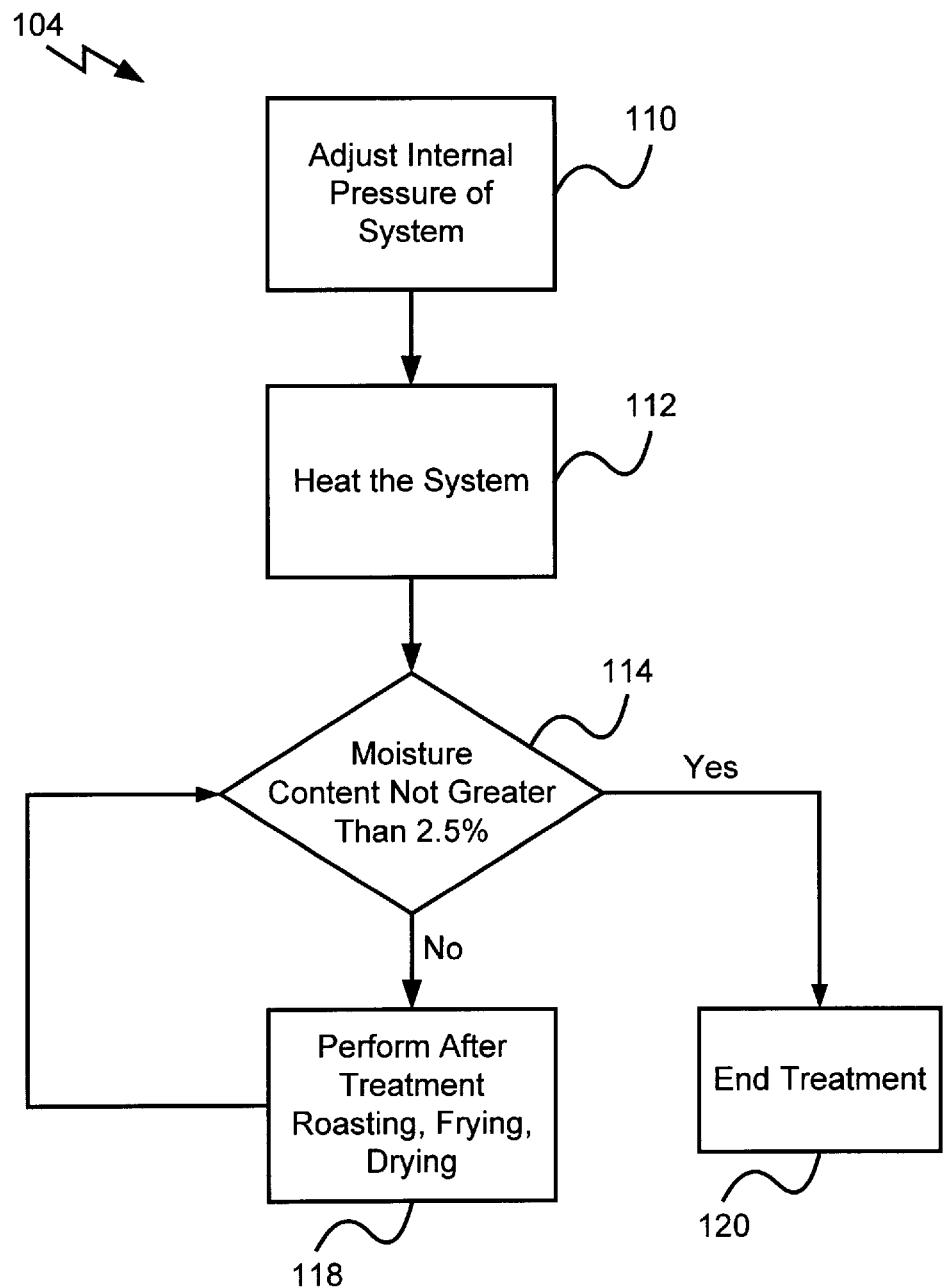
FIG. 1b shows a flowchart of anti-oxidation step 104 of FIG. 1a in accordance with the present invention.

Referring next to FIG. 1b, the 104 step of performing the anti-oxidation treatment process may be more particularly appreciated. The anti-oxidation treatment begins in step 110 by adjusting the internal pressure of the sealed treatment apparatus with air or nitrogen in order to apply 0.5 to 1.5 $kg/cm^2$ of pressure to the nuts. In step 112, heat the nuts within the apparatus preferably for 20 to 60 minutes at a temperature of approximately 90° to 130° C. while applying a pressure of approximately 0.5 to 2 $kg/cm^2$. In step 114, if the moisture content is greater than 2.5 percent, then in step 118 of FIG. 1b, perform an after-treatment of roasting or frying, etc., so that the prescribed moisture content decreases to be within the range of 0.9 to 2.5 percent and then in step 120 end the treatment. If in step 114 the moisture content is not greater than 2.5 percent, then in step 120 end the treatment.

The method as described above may be applied to raw food materials such as nuts or seeds by a batch or by a continuous anti-oxidation system. In either case, the steps as described with regard to FIGS. 1a and 1b are to be followed.

For example, in a batch system, the treatment apparatus is a long tank that includes an introduction port which controls the introduction and pressurization of compressed air or nitrogen gas. Heating of the nuts in step 104 may be provided by circulating steam, hot water or another type of heating medium etc. through a jacket installed around the circumferential wall of the long tank. Alternatively to heat the nuts a heating source such as an electrothermal heater, pipes, plates, or other type of heating supply may be installed in the long tank of the batch system.

Figure 2:
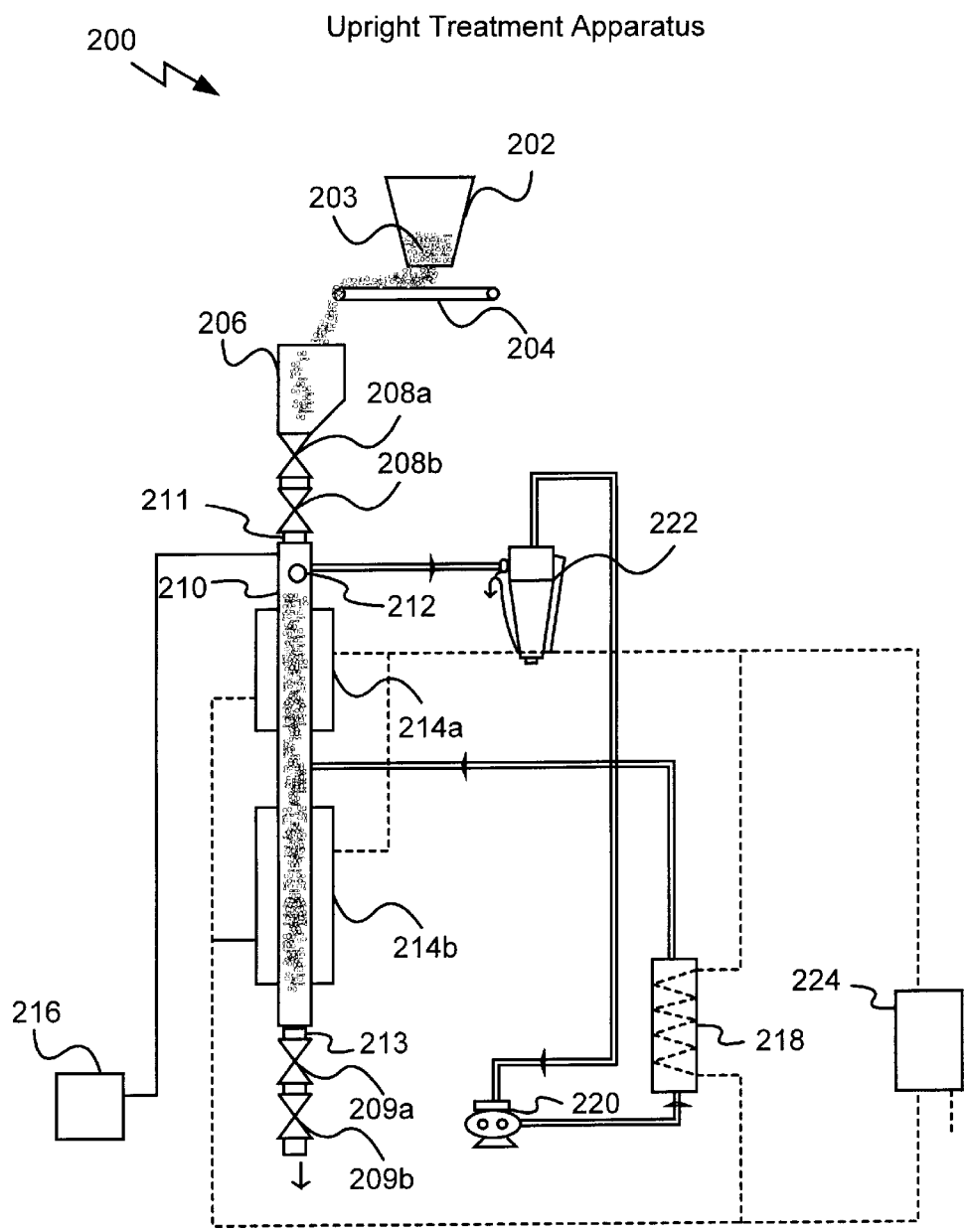
FIG. 2 shows a diagram of a vertical treatment apparatus in accordance with the present invention.

Referring next to FIG. 2, an example of an upright continuous treatment apparatus 200 used for performing anti-oxidation food treatment according to the method of FIG. 1 may be appreciated. FIG. 2 shows a main hopper 202 for receiving and grating the raw food material 203. The output of main hopper 202 is moved via a feeder 204 such as a conveyer belt to a hopper 206. Hopper 206 receives and grates the raw food material 203 provided by feeder 204.

Two ball valves 208a and 208b, directly coupled to an introduction port 211 of a pressurized main apparatus 210, and two ball valves 209a and 209b directly coupled to a discharge port 213 of the pressurized main apparatus 210 respectively supply and discharge compressed air of the tightly closed main apparatus 210. A heater 218 coupled to main apparatus 210 heats raw food material 203 enclosed within main apparatus 210. Boiler 224 heats water to create steam that either exits the system or returns to boiler 224 as condensed water through heater 218 and jackets 214a and 214b installed around the circumstantial wall of main apparatus 210. Heater 218 heats air or nitrogen gas. A blower 220 circulates the air or nitrogen gas to main apparatus 210 to provide a hot gaseous draft that flows directly over raw food material 203. A compressor 216 provides compressed air to main apparatus 210 for adjusting the pressure within main apparatus 210 to a specified level. A collector 222 collects condensed water that is extracted from water where dust and other items have been removed during the treatment process. Further, collector 222 adjusts the moisture content of the raw food materials undergoing the anti-oxidation process.

Pursuant to the method described in FIGS. 1a and 1b, main hopper 202 receives food material 203. Feeder 204 moves raw food material 203 to hopper 206. The raw food material output by hopper 206 flows through ball valves 208a, 208b, introduction port 211, and into main pressurized main apparatus 210. Once raw food material 203 fills main pressurized main apparatus 210 to the level of a side glass 212, ball valves 208a, 208b, 209a and 209b close and compressor 216 provides compressed air to main pressurized main apparatus 210 to adjust the internal pressure of the system to be within the range of 0.5 to 1.5 $kg/cm^2$. Next, boiler 224 heats water to create steam that either exits the system or returns to boiler 224 as condensed water through heater 218 and jackets 214a and 214b. Heater 218 heats air or nitrogen gas. A blower 220 circulates the air or nitrogen gas to main apparatus 210 to provide a hot gaseous draft that flows directly over raw food material 203. Raw food material 203 is continuously fed in by the feeder 204, and the discharged product continuously exits the main apparatus 210 so that a constant level of raw food material 203 is maintained within main apparatus 210. Raw food material 203 is heated and pressurized within main apparatus 210 for a time period that allows raw food material 203 to acquire an appropriate moisture content.

Although not shown, once raw food material 203 exits via discharge port 213 and ball valves 209a, 209c, the raw food materials 203 are cooled and packaged.

Figure 3:
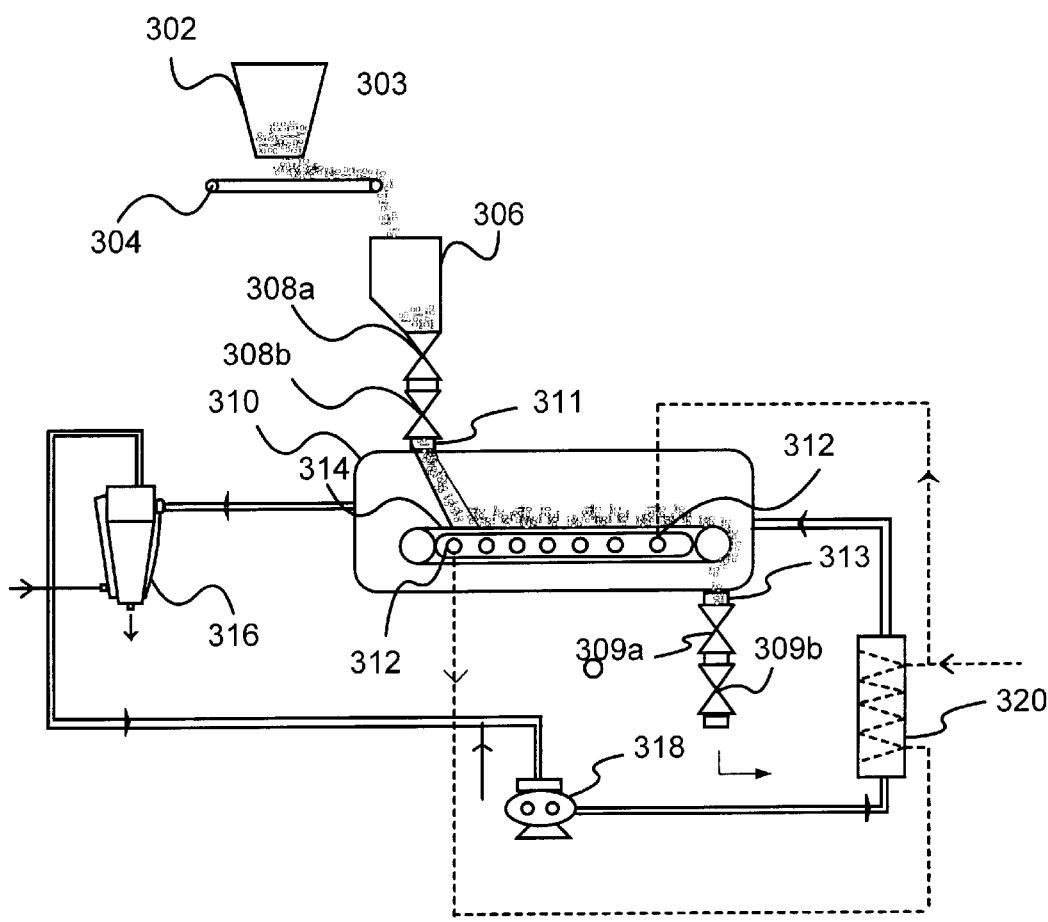
FIG. 3 shows a diagram of a horizontal treatment apparatus in accordance with the present invention.

Referring next to FIG. 3, an example of a horizontal treatment apparatus 300 used for performing anti-oxidation food treatment according to the method of FIG. 1 may be appreciated. FIG. 3 shows a main hopper 302 for receiving and grating the raw food material 303. The output of main hopper 302 is moved via a feeder 304, such as a conveyer belt, to a hopper 306. Hopper 306 receives and grates raw food material 303 provided by feeder 304.

Two ball valves 308a and 308b are directly coupled to an introduction port 311 of the main pressurized heating apparatus 310, and two ball valves 309a and 309b are directly coupled to a discharge port 313 of the main pressurized heating apparatus 310. Metal mesh belt 314 moves raw food material 303 while raw food material 303 receives pressure and a heater 320 coupled to main apparatus 310 heats the raw food material 303 enclosed within main apparatus 310. A blower 318 circulates the air or nitrogen gas to main apparatus 310 to provide a hot gaseous draft that flows directly over raw food material 303. A collector 316 collects condensed water that is extracted from water where dust and other items have been removed during the treatment process. Further, collector 316 adjusts the moisture content of the raw food materials undergoing the anti-oxidation process.

Pursuant to the method described in FIG. 1, main hopper 302 receives raw food material 303. Feeder 304 moves raw food material 303 to hopper 306. The raw food material output by the hopper 306 flows through ball valves 308a, 308b and introduction port 311, and into main pressurized heating apparatus 310. While raw food material 303 moves along metal mesh belt 314, ball valves 308a, 308b, 309a and 309b close, and a compressor provides compressed air to main pressurized heating apparatus 310 to adjust the internal pressure of the system to be within the range of 0.5 to 1.5 kg/cm$^2$. Next, a boiler (not shown) heats water to create steam that either exits the system or returns to the boiler as condensed water through heater 320 and steam coils 312a and 312b. Heater 320 heats air or nitrogen gas. A blower 318 circulates the air or nitrogen gas to main apparatus 310 to provide a hot gaseous draft that flows directly over raw food material 303. Raw food material 303 is continuously fed in by feeder 304, and the discharged product is continuously output from main apparatus 310 so that a constant level of raw food material 303 is maintained within main apparatus 310. Raw food material 303 is heated and pressurized within heating apparatus 310 for a time period so that the raw food material 303 acquires an appropriate moisture content.

It will be appreciated that instead of ball valves, rotary valves, butteryfly valves or other types of valves may be used to tightly close the pressurized continuous heating apparatus of FIGS. 2 and 3. It will further be appreciated that instead of steam, the heat source of heater 218 and 320 may be provided by a radiation, electric or microwave generator. One of ordinary skill in the art will recognize that with regard to the horizontal type apparatus of FIG. 3, a screw feeder may provide the agitation and constant-rate supply of raw food material 303 to the main pressurized heat apparatus 310. Other appropriate apparatus can be used to perform the method of FIG. 1.

As shown in step 118 of FIG. 1b, it may be necessary to heat the output of the anti-oxidation system of the present invention under pressure with an ordinary roaster, drier, or frier etc. in order for the processed raw food material to acquire a desired texture and moisture content. For example, it may be necessary to roast the nuts in order for the nuts to acquire a crunchy texture. It will be appreciated that once the raw food material undergoes the anti-oxidation process of FIG. 1 to acquire an anti-oxidation structure, an additional heat treatment will not destroy the anti-oxidation structure of the raw food material.

It will be appreciated that in the case of certain nuts such as walnuts and pecans, the raw food materials are roasted solely by the pressurized heat treatment of steps 110 and 112 of FIG. 1 and do not require the additional heat treatment such as roasting of step 118. Hence, the nuts are converted to an edible state without additional roasting. Furthermore, in cases where a roasted product (obtained by shallow roasting) is used as a raw food material, the roasting process may in some cases be completed by the above-mentioned heat treatment under pressure, so that the above-mentioned after-treatment roasting is unnecessary.

Regardless of whether an additional heat treatment such as roasting is performed, the anti-oxidation treatment of the present invention is preferably performed as follows: a tightly closed treatment apparatus is equipped with a heating source, the internal pressure is adjusted to a value of 0.5–1.5 kg/cm$^2$ G through the application of air or nitrogen gas. Afterward, heating is performed for a heating time of 20 to 60 minutes at a temperature of approximately 90° to 130° C. and at a pressure of approximately 0.5–2 kg/cm$^2$ G, so that the moisture content of the raw food material is reduced from the original value by 0.3 percent or more, preferably 0.5–3 percent. For example, in a case where the moisture content prior to treatment is five percent, the moisture content following treatment decreases to 2–4.5 percent.

With regard to the cooling of the processed raw product that have undergone the anti-oxidation process of FIG. 2, cooling may be provided by use of a fan or other device that cools the processed raw food material in the open atmosphere. Alternatively, the processed raw food material may be cooled within an enclosed cooling apparatus. With regard to the final packaging of the processed raw food material, it will be appreciated that all generally acceptable forms of food packaging may be used to package the final food product.

Furthermore, in cases where the product is temporarily received in an open vessel following step 112 of FIG. 1 of the above-mentioned heat treatment performed under pressure, it is necessary to cool the product immediately before transfer to the open vessel. Accordingly, it is desirable that a cooling zone be provided in the lower portion of the apparatus used for the above-mentioned heat treatment under pressure. In this regard, it is also possible to improve the efficiency of this process by performing the above-mentioned pressurized heat treatment and the above-mentioned after-treatment roasting as a continuous process.

The nuts or seeds thus obtained, which have been subjected to an anti-oxidation treatment, may then be packaged in any desired conventional form of packaging, and shipped as commercial products.

EXAMPLE USE OF THE ANTI-OXIDATION TREATMENT PROCESS

FIG. 4 shows:

Example 1 of a Preferred Embodiment

Raw US walnuts LMP (light medium pieces) were fed into a pressurized heat treatment tank equipped with valves in the supply port and discharge port which made it possible to maintain the tank in a tightly closed state. Next, compressed air was blown into the tank so that the system was maintained at an internal pressure of 1.0 kg/cm$^2$. The contents of the tank were heated to 120° C. by means of a steam heating jacket and the circulation of steam-heated air via circulating lines. Furthermore, the internal pressure of the system was maintained at 1.0 to 1.2 kg/cm during heating. The raw-material walnuts were continuously fed at the rate of 10 kg/hour, and, after reaching a temperature of 120° C., were maintained at this temperature for 30 minutes. After the treated product was allowed to stand until cool, the moisture content of the treated product was measured. Due to the anti-oxidation treatment process, the moisture content had dropped to 2% from the original moisture content of the raw food material of 3.62%. One hundred and twenty grams of this product were placed and stored in a plastic bag maintained at 37° C. No. 1 shows the oxidation stability of this sample with a POV (peroxide value) over time of Example 1.

Comparative Example 1(A) of a Conventional Treatment

Raw walnuts LMP as used in Example 1 were heated for 30 minutes at 120° C. under normal atmospheric pressure. After being cooled, the sample was stored. No. 1(A) shows the POV measured over time of Comparative Example 1(A).

Comparative Example 1(B) of Another Preferred Embodiment

Raw walnuts LMP as used in Example 1 and Comparative Example 1(A) were heated to 85° C. at an internal pressure of 1.0 to 1.2 kg/cm$^2$ using the same apparatus as in Example 1, and were maintained at this temperature and pressure for 30 minutes. After being cooled, the sample was stored using the method of Example 1. No. 1(B) shows the POV measured over time of Comparative Example 1(B).

Comparative Example 1(C) of Another Preferred Embodiment

Raw walnuts LMP as used in Example 1, Comparative Example 1(A) and Comparative Example 1(B) were heated to 120° C. at an internal pressure of 0.3 to 0.4 kg/cm$^2$ using the same apparatus as in Example 1 and Comparative Example 1(B), and were maintained at this temperature and pressure for 30 minutes. After being cooled, the sample was stored using the method of Example 1. No. 1(C) shows the POV measured over time of Comparative Example 1(C).

FIG. 5 shows:

Example 2 of a Preferred Embodiment

Peanuts of the runner type with a size of 40–50 grains/ounce were roasted so that the moisture content was adjusted to 3.1%, and were then treated in the same manner as in Example 1. However, the peanuts were heated to a temperature of 110 to 120° C., and were maintained at this temperature for 40 minutes. After the peanuts were allowed to stand until cool, it was found that the moisture content had dropped to 2.1%. One hundred and twenty grams of this product was placed and stored in a plastic bag at a temperature of 37° C. No. 2 shows the POV tracked over time of Example 2.

Comparative Example 2(A) of a Conventional Treatment

Peanuts as used in Example 2 were heated to a temperature of 110° to 120° C. at normal atmospheric pressure. After being heated for 40 minutes, the peanuts were cooled and then stored. No. 2(A) shows the POV measured over time of Comparative Example 2(A).

Comparative Example 2(B) of Another Preferred Embodiment

Peanuts as used in Example 2 and Comparative Example 2(A) were heated to 85° C. at an internal pressure of 1.0 to 1.2 kg/cm using the same apparatus as in Example 1. The peanuts were treated at this temperature and pressure for 40 minutes. After being cooled, the sample peanuts were stored using the same method as disclosed in Example 1. No. 2(B) shows the POV measured over time of Comparative Example 2(B).

Comparative Example 2(C) of Another Preferred Embodiment

Peanuts as used in Example 2, Comparative Example 2(A) and Comparative Example 2(B) were heated to 120° C. at an internal pressure of 0.3 to 0.4 kg/cm$^2$ using the same apparatus as described in Example 1. The peanuts were treated at this temperature and pressure for 40 minutes. After being cooled, the sample peanuts were stored using the method described in Example 1. No. 2(C) shows the POV measured over time of Comparative Example 2(C).

FIG. 6 shows:

Example 3 of a Preferred Embodiment

Peanuts of the runner type with a size of 40–50 grains/ounce and a moisture content of 6% were treated in the same manner as in Example 1. The moisture content following the anti-oxidation treatment was 4.4%. This product was roasted and was then granulated to a size of 3.5 to 6 mesh causing the moisture content of the granulated product to decrease to 1.27%. One hundred and twenty grams of this product were placed in a plastic bag and stored at a temperature of 37° C. No. 3 shows the oxidation stability of this sample with a POV measured over time of Example 3.

Comparative Example 3(A) of A Conventional Treatment

Peanuts as used in Example 3 were roasted with a roaster, and were then granulated to a size of 3.5 to 6 mesh using a granulator as described in Example 3. This peanut sample was stored using the method disclosed in Example 1. No. 3(A) shows the POV measured over time of Comparative Example 3(A).

FIG. 7 shows:

Example 4 of a Preferred Embodiment

Chinese large-grain peanuts (kernel) were treated in the same manner as in Example 1. However, the heating temperature was set at 110° C. The moisture content of the peanuts prior to the anti-oxidation treatment was 6.25%. After the treatment the moisture content decreased to 4.13%. The peanuts shells are blanched by an application of hot water, and were then allowed to dry naturally. The peanuts were then fried at approximately 150° C. and seasoned to produce butter peanuts. One hundred and twenty grams of this product was placed in a plastic bag and stored at a temperature of 37° C. No. 4 shows the POV measured over time of Example 4.

Comparative Example 4(A) of a Conventional Treatment

Figure 8:
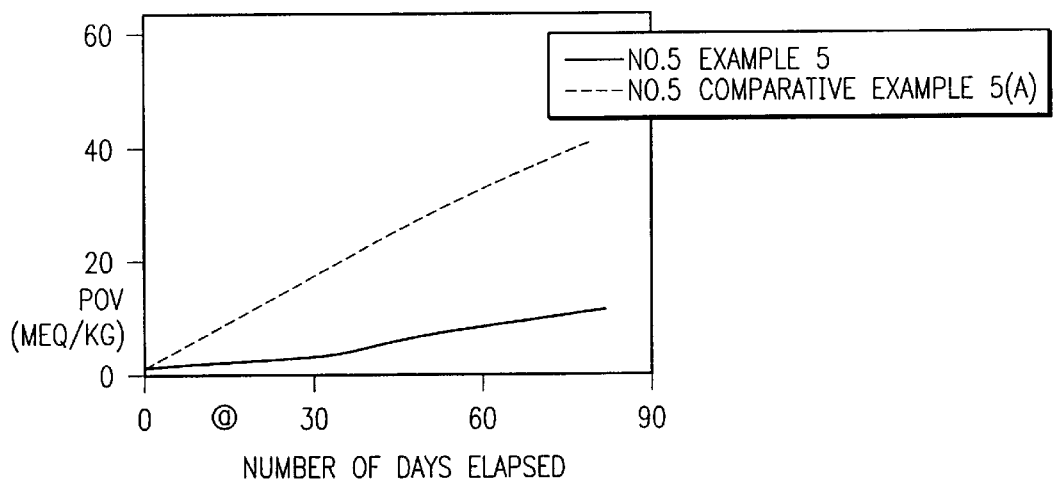
FIG. 8 shows a graph of the results of example 5 using the anti-oxidation treatment of the present invention, and of the results of comparative example 5(A) using a conventional treatment.

The Chinese large-grain peanuts as used in Example 4 were blanched by the application of hot water, and were then fried and seasoned in the same manner as disclosed in Example 4 to produce butter peanuts. This peanut sample was stored using the method as disclosed in Example 4. No. 4(A) shows POV measured over time of Comparative Example 4(A).
FIG. 8 shows:

Example 5 of a Preferred Embodiment

Raw, whole almonds with a moisture content of 4.24% were treated in the same manner as Example 1. However, the internal pressure of the system during heating in the pressurized heat treatment tank was maintained at 1.2 to 1.25 kg/cm$^2$. The moisture content following the treatment was 3.29%. The almonds were then roasted resulting in a decrease in moisture content to 1.61%.

One hundred and twenty grams of this product was placed in a plastic bag and stored at a temperature of 37° C. No. 5 shows the POV measured over time of Example 5.

Comparative Example 5(A) of a Conventional Treatment

The same whole raw almonds as those used in Example 5 were roasted by the same roaster as disclosed in Example 5. This sample was stored using the same method as disclosed in Example 5. No. 5(A) shows the POV measured over time of Comparative Example 5(A).

Figure 4:
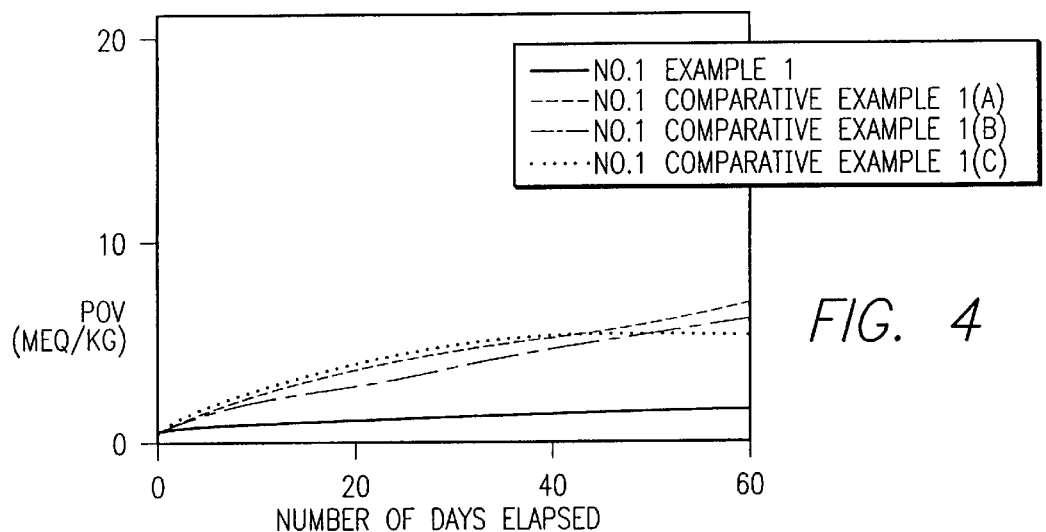
FIG. 4 shows a graph of the results of example 1 and comparative examples 1(B)–1(C) using the anti-oxidation treatment of the present invention, and of the results of comparative example 1(A) using a conventional treatment.

The anti-oxidation treatment conditions used and the oxidation stability characteristics obtained in Examples 1 through 5 and Comparative Examples 1(A)–1(C), 2(A)–2(C), 3(A), 4(A) and 5(A) are shown in Tables 1-1, 1-2 and 1-3. More particularly, Table 1-1 shows examples of preferred embodiments of the present invention as applied to five types of nuts. Table 1-2 shows examples of other preferred embodiments of the present invention as applied to comparative examples 1B, 2B, 1C and 2C. Table 1-3 shows conventional treatments as applied to comparative examples 1A, 2A, 3A, 4A and 5A. One of ordinary skill in the art will recognize the significantly improved oxidation stability provided by the present invention and listed in Table 1-1. For example, in the respective cases shown in FIG. 4 Example 1, which used raw US walnuts LMP as a raw food material, required more than 150 days to reach a POV of 10, and thus showed a conspicuously superior oxidation stability. In contrast, Comparative Example 1(A), in which a treatment was performed at normal atmospheric pressure. Comparative Example 1(B), in which a low-temperature (85° C.) treatment was performed, and Comparative Example 1(C), in which a low-pressure (0.3 to 0.4 kg/cm$^2$) treatment was performed, reached the same POV of 10 in 70 to 90 days.

Figure 5:
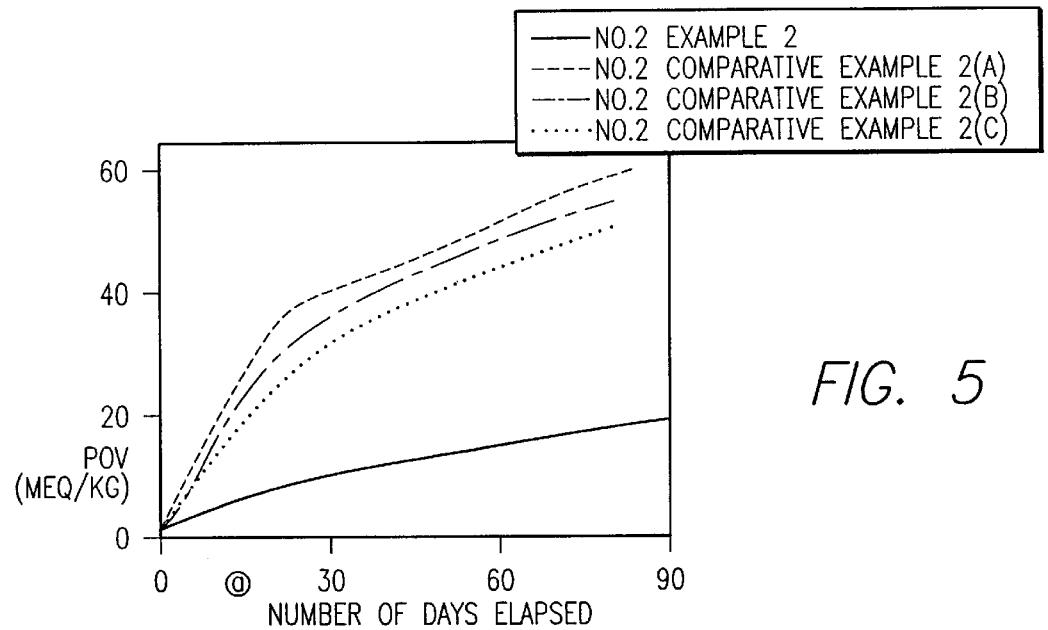
FIG. 5 shows a graph of the results of example 2 and comparative examples 2(B)–2(C) using the anti-oxidation treatment of the present invention, and of the results of comparative example 2(A) using a conventional treatment.
Figure 6:
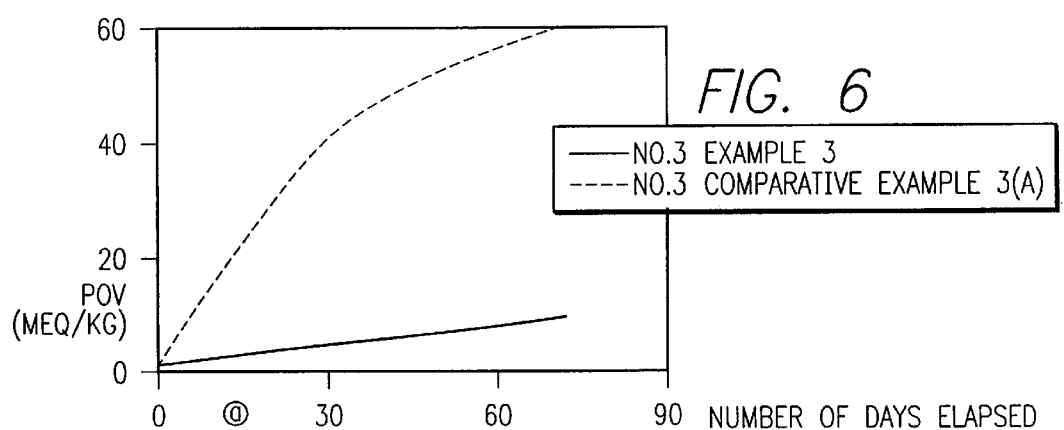
FIG. 6 shows a graph of the results of example 3 using the anti-oxidation treatment of the present invention, and of the results of comparative example 3(A) using a conventional treatment.
Figure 7:
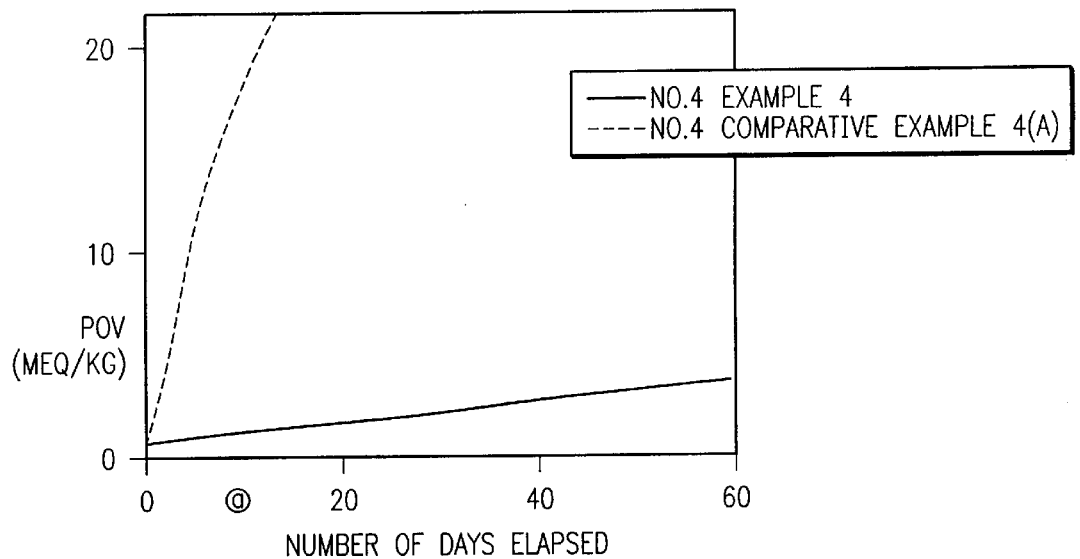
FIG. 7 shows a graph of the results of example 4 using the anti-oxidation treatment of the present invention, and of the results of comparative example 4(A) using a conventional treatment.

Similarly, in the respective cases shown in FIG. 5 including Example 2 and Comparative Examples 2(A)–2(C), which used shallow-roasted whole peanuts as a raw food material, Example 2 showed an oxidation stability that was conspicuously superior to that of the three comparative examples using low temperature, or low pressure.

In a system where raw whole peanuts were subjected to an anti-oxidation treatment and were then roasted and granulated, Example 3 showed an oxidation stability far superior to that of the ordinarily roasted peanuts produced in Comparative Example 3(A). Furthermore, in the frying treatment of Chinese large-grain peanuts, Example 4 similarly showed an oxidation stability far superior to that of the ordinarily fried peanuts produced in Comparative Example 4(A).

Still further, in the case of raw whole almonds, Example 5 showed far superior oxidation stability compared to the ordinarily roasted almonds produced in Comparative Example 5(A).

Tables 1-1, 1-2 and 1-3 show the results of Examples 1–5 and of the Comparative Examples described hereinabove.

Treatment conditions and oxidation stability

TABLE 1-1

Examples of Preferred Embodiments

| FIG. | Item | Name of Material | State of sample before treating | (1) Treatment conditions Temperature (Celsius) | Pressure (kg/cm$^2$) | Maintenance time (minutes) | (2) State of the sample after treatment | Oxidation Stability Days required to reach POV of 10 (days) |
|---|---|---|---|---|---|---|---|---|
| 4 | Example 1 | Raw US walnuts LMP (Light Medium Piece) | Raw | 120 | 1.0–1.2 | 30 | Half-roasted LMP | 150 |
| 5 | Example 2 | Peanut, US No. 1 *Medium Runner | Half roasted | 110–120 | 1.0–1.2 | 40 | Roasted whole | 30 |
| 6 | Example 3 | Peanut, US No. 1 *Medium Runner | Raw | 110–120 | 1.0–1.2 | 30 | *Roasted & Granulated size 4–5 mm | 60 |
| 7 | Example 4 | Chinese peanuts Virginia type | Raw | 110 | 1.0–1.2 | 30 | *Fried whole | 100 |
| 8 | Example 5 | Raw whole almonds with skin | Raw | 120 | 1.2–1.25 | 30 | *Roasted whole | 65 |

-continued

Treatment conditions and oxidation stability

TABLE 1-2

Examples of Other Preferred Embodiments

| FIG. | Item | Name of Material | State of sample before treating | Temperature (Celsius) | Pressure (kg/cm²) | Maintenance time (minutes) | (2) State of the sample after treatment | Oxidation Stability Days required to reach POV of 10 (days) |
|---|---|---|---|---|---|---|---|---|
| 4 | Example 1B | Raw whole walnuts LMP (Light Medium Piece) | Raw | 85 | 1.0–1.2 | 30 | Half-roasted LMP | 90 |
| 5 | Example 2B | Peanut, US No. 1 *Medium Runner | Half roasted | 85 | 1.0–1.2 | 40 | Roasted whole | 6 |
| 6 | Example 1C | Raw US walnuts LMP (Light Medium Piece) | Raw | 120 | 0.3–0.4 | 30 | Half-roasted LMP | 90 |
| 7 | Example 2C | Peanut, US No. 1 *Medium Runner | Half roasted | 110–120 | 0.3–0.4 | 40 | Roasted whole | 9 |

TABLE 1-3

Conventional Treatments

| FIG. | Item | Name of Material | State of sample before treating | Temperature (Celsius) | Pressure (kg/cm²) | Maintenance time (minutes) | (2) State of the sample after treatment | Oxidation Stability Days required to reach POV of 10 (days) |
|---|---|---|---|---|---|---|---|---|
| 4 | Example 1A | Raw US walnuts LMP (Light Medium Piece) | Raw | 120 | 0 | 30 | Half-roasted LMP | 70 |
| 5 | Example 2A | Peanut, US No. 1 *Medium Runner | Half roasted | 110–120 | 0 | 40 | Roasted whole | 6 |
| 6 | Example 3A | Peanut, US No. 1 *Medium Runner | Raw | Roasted with conventional roaster at 150° C. | 0 |  | *Granulated into size 4–5 mm | 6 |
| 7 | Example 4A | Chinese peanuts Virginia type | Raw | Fried with conventional fryer at 150° C. | 0 |  | Fried whole | 4 |
| 8 | Example 5A | Raw whole almonds with skin | Raw | Roasted with conventional roaster at 160° C. | 0 |  | Roasted whole | 14 |

*In order to achieve oxidation stability, after the first treatment (1) of the raw food materials was performed, the raw food materials were reprocessed again using the regular method as test samples.
*According to American USDA standards, the U.S. No. 1 Medium Runner is a peanut, of the Runner type, size: 40–50 grains/oz.
Note:
For all example data, each sample under the conditions of (2) have been measured and maintained at 37° C. within the maintenance apparatus.

It can therefore be appreciated that a new and novel anti-oxidation method and apparatus for treating raw food such as nuts has been described. It will appreciated by those skilled in the art that, given the teaching herein, numerous alternative and equivalents will be seen to exist which incorporate the invention disclosed herein. As a result, the invention is not to be limited by the foregoing exemplary embodiments, but only by the following claims.

We claim:

1. A method of treating raw food comprising the steps of:
  placing the raw food in a closed vessel;
  adjusting the internal pressure of the closed vessel with a pressuring agent to a pressure greater than approximately 0.3 kg/cm² and less than 5 kg/cm²; and
  heating the raw food within the closed vessel, whereby the internal pressure and the heat cause a polymolecular layer of water to form on a surface of the raw food so that the raw food becomes substantially oxidation-resistant.

2. The method of claim 1, wherein the raw food is nuts.

3. The method of claim 1, wherein the system is a sealed treatment apparatus.

4. The method of claim 1 further including the step of cooling the raw food.

5. The method of claim 1, wherein the step of adjusting the internal pressure includes:
  supplying air as the pressurizing agent.

6. The method of claim 1, wherein the step of adjusting the internal pressure includes:
  supplying nitrogen as the pressurizing agent.

7. The method of claim 1, wherein the step of heating the raw food occurs for approximately 20 to 60 minutes at a temperature range from 90° C. to 130° C.

8. The method of claim 1, wherein the heating step further includes:
  applying approximately 0.5 to 2 kg/cm² of pressure to the raw food.

9. The method of claim 1 further including the step of:
  determining after the heating step whether the raw food has a moisture level greater than 2.5 percent.

10. The method of claim 9, wherein if the moisture level is greater than 2.5 percent then performing the step of:

applying after the heating step an after heat treatment to the raw food.

11. The method of claim 10, wherein the after heat treatment is selected from the group consisting of roasting, drying and frying.

12. The method of claim 10, wherein the after heat treatment includes the step of granulating the raw food.

13. The method of claim 4, wherein the step of cooling the raw food includes:

opening the vessel to remove condensed moisture from the exterior of the raw food.

14. The method of claim 5, wherein the step of supplying air includes:

supplying air in a pressure range from 0.5 $kg/cm^2$ but not exceeding 1.5 $kg/cm^2$.

15. The method of claim 6, wherein the step of supplying nitrogen includes:

supplying nitrogen in a pressure range from 0.5 $kg/cm^2$ but not exceeding 1.5 $kg/cm^2$.

16. The method of claim 1, wherein the step of adjusting the internal pressure includes:

adjusting the internal pressure of the closed vessel to a pressure between approximately 0.3 $kg/cm^2$ and approximately 2 $kg/cm^2$.

* * * * *